United States Patent [19]

Nakanishi et al.

[11] Patent Number: 4,998,865
[45] Date of Patent: Mar. 12, 1991

[54] BRUSHLESS DC PUMP WITH ENCLOSED CIRCUIT BOARD

[75] Inventors: Shingo Nakanishi, Obu; Susumu Yamamoto, Kawasaki, both of Japan

[73] Assignees: Aisan Kogyo Kabushiki Kaisha, Obu; Fuji Electric Co., Ltd., Kawasaki, both of Japan

[21] Appl. No.: 377,326

[22] Filed: Jul. 10, 1989

[30] Foreign Application Priority Data

Jul. 11, 1988 [JP] Japan .................................. 63-91987
Dec. 8, 1988 [JP] Japan ........................... 63-310843[U]

[51] Int. Cl.⁵ .......................... F04B 39/00; F04B 17/00
[52] U.S. Cl. ........................... 417/423.7; 417/423.14; 417/366; 417/372; 310/51
[58] Field of Search ...................... 417/423.1, 353, 366, 417/372, 423.7, 423.14; 310/68 B, 51; 318/254

[56] References Cited

U.S. PATENT DOCUMENTS

| 4,005,347 | 1/1977 | Erdman | 318/138 |
| 4,726,746 | 2/1988 | Takada et al. | 417/366 |
| 4,773,829 | 9/1988 | Vettori | 417/366 |

FOREIGN PATENT DOCUMENTS

56-88982 7/1981 Japan .
61-14496 1/1986 Japan .
62-59794 4/1987 Japan .

*Primary Examiner*—Leonard E. Smith
*Assistant Examiner*—David W. Scheuermann
*Attorney, Agent, or Firm*—Dennison, Meserole, Pollack & Scheiner

[57] ABSTRACT

A motor-driven pump including a pump housing; a brushless motor mounted in the pump housing; pump means mounted in the pump housing and adapted to be driven by the brushless motor; and a circuit package mounted in a liquid passage defined in the pump housing, the circuit package enclosing a circuit board mounting thereon a control circuit for controlling rotation of the brushless motor and means for detecting a rotor position of the brushless motor, wherein the circuit board is fixed through an elastic member to an inner wall of the circuit package with a gap defined between the circuit board and the inner wall, and the circuit package is opposed to the brushless motor at a position where the circuit board is spaced a distance from the brushless motor in an axial direction of a rotating shaft of the brushless motor.

29 Claims, 13 Drawing Sheets

BRUSHLESS DC PUMP WITH ENCLOSED CIRCUIT BOARD

BACKGROUND OF THE INVENTION

The present invention relates to a motor-driven pump having a brushless motor for pumping liquid.

A motor-driven pump having a pump section and a motor section for driving the pump section which are integrally connected is known in the prior art. Liquid is sucked from a liquid inlet of the pump into the pump section, and pressure of the liquid is increased in the pump section. The liquid having an increased pressure is fed through a passage defined between a rotor and a stator of the motor section to a liquid outlet of the pump. Although a brush motor having a commutator has been utilized for the motor section, it has a problem that a commutator tends to be worn. In the circumstances, a brushless motor having no commutator has been recently utilized for the motor section (Japanese Patent Laid-open Publication No. 56-88982 and 61-14496).

The brushless motor is classified into a sensor type having a position detecting element such as Hall device, magnetodiode and magnetoresistance device for detecting a pole position of the rotor and a sensorless type not having such a position detecting element. In the sensor type motor-driven pump, the pole position of the rotor formed of permanent magnet is detected by the position detecting element. As the result of detection, it is decided which of coils wound on pole portions of the stator should be excited. The excitation of the decided coil is switched on and off by a control circuit having a transistor and the like. The position detecting element is so provided as to sense a magnetic flux generated by a sensor magnet fixed to the rotor or a rotating shaft of the motor. Such a motor-driven pump is disclosed in Japanese Utility Model Laid-open Publication No. 62-59794, for example. The position detecting element is provided in the vicinity of the rotor so as to improve the sensitivity of the detecting element. Further, the control circuit is integrally connected to the pump section and the motor section so as to make the pump compact and easy to mount. Further, the control circuit is enclosed in a circuit package having a high heat conductivity from the viewpoint of protection of the control circuit from heat, and the circuit package is preferably located in a liquid passage in the pump so as to cool the circuit package. However, in the prior art motor-driven pump, a circuit board for mounting the position detecting element thereon is entirely fixed on an inner surface of a thin wall of the circuit package, and the thin wall tends to be exposed to repeated stress due to fluctuation in liquid pressure upon driving and stopping of the pump. As a result, there is a possibility of the circuit board being damaged by the pressure fluctuation to cause adverse affect on the detection accuracy. Although this problem can be eliminated by increasing a wall thickness of the circuit package, such an increase in wall thickness will cause a reduction in sensitivity of the position detecting element. Furthermore, it is necessary to ensure precise positioning between the position detecting element and the stator, so as to improve the detection accuracy and proper excitation timing for the coils.

On the other hand, in the sensorless type motor-driven pump, a rotor position is detected from a counter electromotive force generated by rotating the rotor. However, although the above-mentioned position detecting element is not needed, many special circuit such as dummy start signal generating circuit, normal start selector circuit and fail-safe circuit are required. As a result, the control circuit becomes complex, and the number of parts constituting the control circuit is increased to render the compactness of the pump difficult.

SUMMARY OF THE INVENTION

It is a first object of the present invention to provide a motor-driven pump which may improve the sensitivity of the position detecting device for detecting a rotor position of the motor.

It is a second object of the present invention to provide a motor-driven pump which may prevent slippage and damage of the circuit board in the circuit package.

It is a third object of the present invention to provide a motor-driven pump which may improve the positioning of the position detecting element with respect to the stator of the motor.

According to a first aspect of the present invention, there is provided a motor-driven pump comprising a pump housing; a brushless motor mounted in said pump housing; pump means mounted in said pump housing and adapted to be driven by said brushless motor; and a circuit package mounted in a liquid passage defined in said pump housing, said circuit package enclosing a circuit board mounting thereon a control circuit for controlling rotation of said brushless motor and means for detecting a rotor position of said brushless motor, wherein said circuit board is fixed through an elastic member to an inner wall of said circuit package with a gap defined between said circuit board and said inner wall, and said circuit package is opposed to said brushless motor at a position where said circuit board is spaced a distance from said brushless motor in an axial direction of a rotating shaft of said brushless motor.

With this construction, even when the high liquid pressure is externally applied to the circuit package to deflect the thin wall of the circuit package, the thin wall of the circuit package is prevented from contacting the circuit board owing to the gap defined therebetween. Further, as the circuit board is fixed through the elastic member to the inner surface of the circuit package, the shock due to fluctuation in the liquid pressure is absorbed by the elastic member to thereby prevent slippage and damage of the circuit board. In addition, since the circuit package is located in the liquid passage, the circuit devices and the circuit board in the circuit package are normally cooled by the liquid flowing in the liquid passage, and they are protected from heat generated in the circuit package.

According to a second aspect of the present invention, there is provided a motor-driven pump comprising a pump housing; a brushless motor mounted in said pump housing and having a rotor and a stator winding a coil thereon; pump means mounted in said pump housing and adapted to be driven by said brushless motor; means for controlling rotation of said brushless motor; means for detecting a pole position of said rotor of said brushless motor; a circuit board for mounting said control means and said detecting means; a circuit package for enclosing said circuit board; first positioning means for positioning said stator with respect to said pump housing; and second positioning means for positioning said detecting means with respect to said pump housing.

With this construction, the stator of the motor is positioned with respect to the pump housing by the first positioning means. On the other hand, the position detecting means mounted on the circuit board in the circuit package is also positioned with respect to the pump housing by the second positioning means. Therefore, the position detecting means can be precisely positioned with respect to the stator of the motor. Accordingly, the rotation of the motor can be precisely controlled to thereby prevent a reduction in pump efficiency.

The invention will be more fully understood from the following detailed description and appended claims when taken with the drawings.

DETAILED DESCRIPTION OF THE PREFERRED EMBODIMENTS

Figure 1:
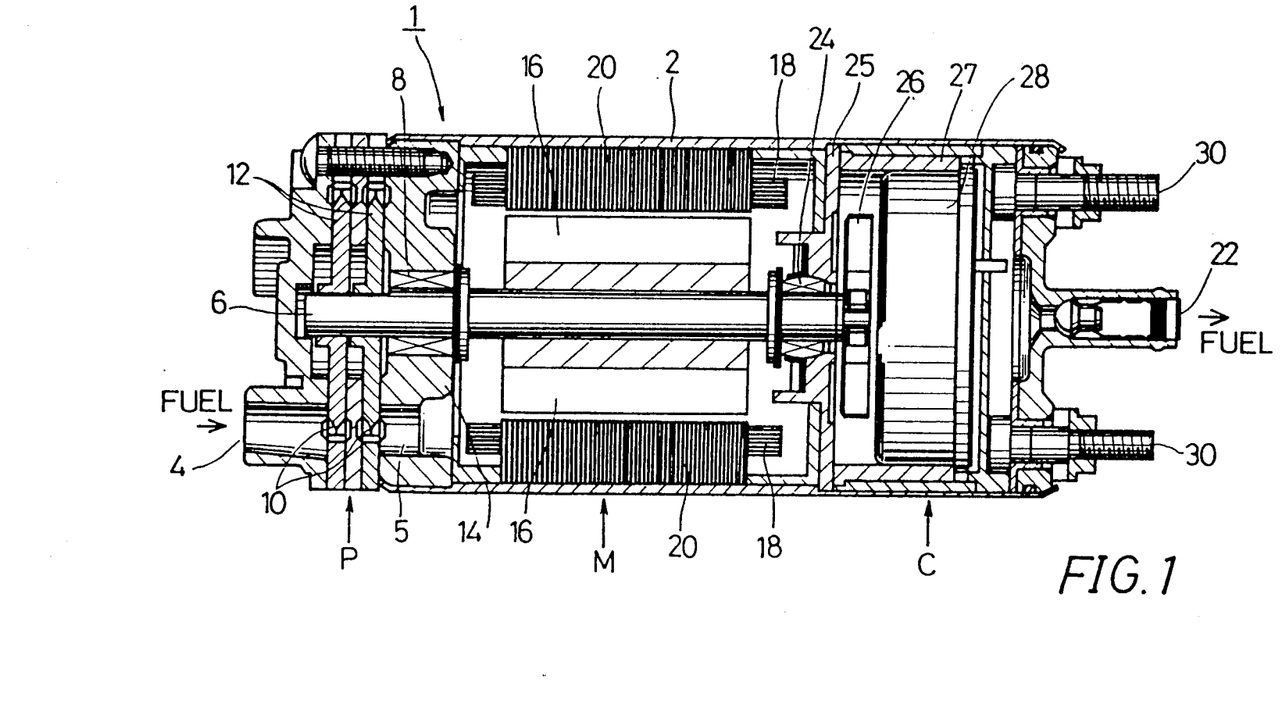
FIG. 1 is a vertical sectional view of a first preferred embodiment of the motor-driven pump according to the present invention.

Referring to FIG. 1, reference numeral 1 generally designates a first preferred embodiment of the motor-driven fuel pump according to the present invention. The fuel pump 1 is constructed of a pump section P, a motor section M for driving the pump section P and a control circuit section C for controlling the motor section M. These sections P, M and C are integrally connected and mounted in a cylindrical pump housing 2. Reference numerals 4 and 22 designate a fuel inlet and a fuel outlet, respectively.

The pump section P includes a pair of impellers 12 each having a plurality of circumferential vanes 10. The impellers 12 are fixedly mounted on a rotating shaft 6 of the motor section M rotatably supported at its one end portion through a bearing 8 to a partition wall 14 partitioning the pump section P and the motor section M. The partition wall 14 is formed with a fuel passage 5 leading from the fuel inlet 4.

The motor section M includes a cylindrical rotor 16 formed of permanent magnet and fixedly mounted on the rotating shaft 6, an annular stator 18 formed of ferromagnetic material and fixedly mounted on the inner circumferential surface of the pump housing 2, and coils 20 wound around plural pole portions of the stator 18 for exciting the pole portions. The rotor 16 has plural poles corresponding to the pole portions of the stator 18. The motor section M is partitioned from the control circuit section C by a partition wall 25. The other end portion of the rotating shaft 6 is rotatably supported through a bearing 24 to the partition wall 25.

Figure 2:
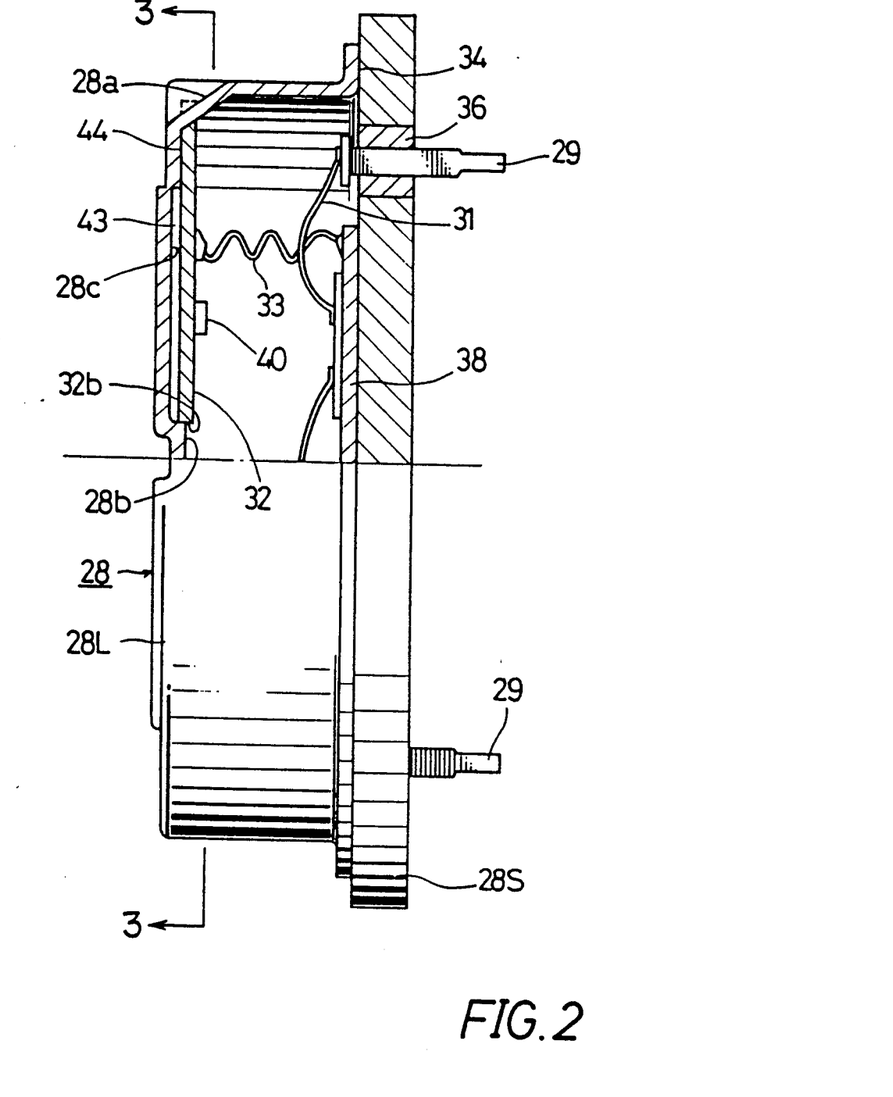
FIG. 2 is a partially sectional side view of the circuit package shown in FIG. 1.

The control circuit section C includes a sensor magnet 26 fixedly mounted at the other end of the rotating shaft 6 and having plural magnet elements corresponding to the poles of the rotor 16, and a circuit package 28 spacedly opposed to the sensor magnet 26 and enclosing a control circuit for controlling the motor section M. As shown in FIG. 2, the circuit package 28 encloses plural position detecting elements 40 corresponding to the poles of the rotor 16 and circuit boards 32 and 38 for mounting the position detecting elements 40 and other control devices thereon. The circuit package 28 is provided with plural connection terminals 29 to be connected to power terminals 30 and the coils 20. A spacer 27 is provided around the circuit package 28, and there is defined a fuel passage (not shown).

As shown in FIG. 2, the circuit package 28 is formed of metal (e.g., stainless steel) having a high heat conductivity or glass, and is constructed of a substantially cylindrical cap 28L and a circular base plate 28S. The cap 28L is formed with an annular flange 34 entirely welded to the base plate 28S. The connection terminals 29 are inserted through hermetic seal portions 36 such as metal or glass formed in the base plate 28S. The annular circuit board 32 is fixedly mounted on the inner wall surface of the cap 28L opposed to the sensor magnet 26, and the circuit board 38 is bonded to the inner surface of the base plate 28S by adhesive such as silicone rubber.

The position detecting elements (e.g., Hall device) for detecting the angular position of the poles of the rotor 16 are mounted on the inner surface of the circuit board 32, and are arranged on a circle corresponding to the locus of rotation of the magnet elements of the sensor magnet 26. The wall thickness of the cap 28L is relatively small, and the top wall of the cap 28L mounting the circuit board 32 is partially projected outwardly to form an annular indent portion 28c and define an annular space 43 between the indent portion 28c and the outer surface of the circuit board 32 at a portion where the position detecting elements 40 are mounted. In the case that the sensor magnet 26 is not used, the position detecting elements 40 are so arranged as to be opposed to the poles of the rotor 16.

The circuit board 32 is fixed at its outer circumferential portion to the annular inner surface 44 of the top wall of the cap 28L by using adhesive having elasticity even after curing such as silicone rubber.

The control devices mounted on the circuit boards 32 and 38 are connected to each other through lead wires 33, and are also connected to the connection terminals 29 through lead wires 31. However, the circuit board 38 may be omitted provided that all the control devices are mounted on the circuit board 32 only.

Figure 3:
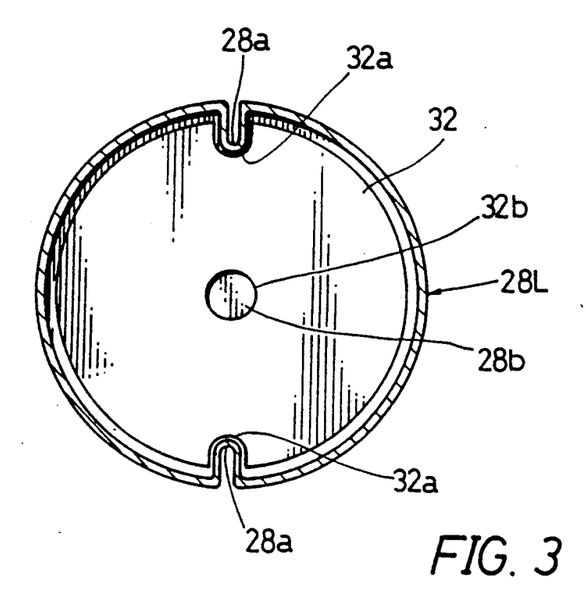
FIG. 3 is a view taken in the direction of arrows D in FIG. 2.

Referring to FIGS. 2 and 3, the cap 28L is formed at its outer circumference with a pair of inward projections 28a at diametrically opposite positions, while the circuit board 32 is formed with a pair of recesses 32a to be engaged with the inward projections 28a of the cap 28L. Further, the cap 28L is formed with a central inward projection 28b, and the circuit board 32 is formed with a central hole 32b to be engaged with the central inward projection 28b of the cap 28L. Thus, the circuit board 32 is firmly positioned with respect to the cap 28L. The base plate 28S is circumferentially positioned to the pump casing 2. Accordingly, the position detecting elements 40 fixed on the circuit board 32 can be positioned with respect to the stator 18. Of course, the shape and the number of the positioning means, that is, the projections 28a 28b, the recesses 32a and the hole 32b may be suitably modified.

Figure 4:
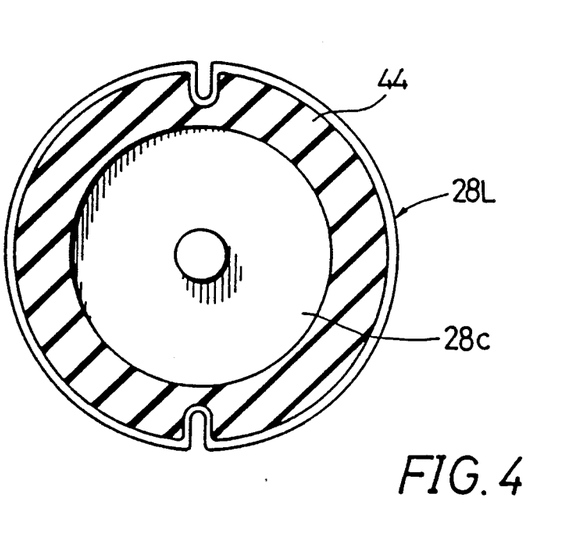
FIG. 4 is a view similar to FIG. 3 with the circuit board removed.

As shown in FIGS. 2 and 4, the annular inner surface 44 of the top wall of the cap 28L is coated with adhesive having elasticity even after curing such as silicone rubber, so as to bond the outer circumferential portion of the circuit board 32 to the annular inner surface 44 of the cap 28L. The adhesive may be replaced by any other elastic member capable of elastically fixing the circuit board 32 to the inner surface 44 of the cap 28L. Such adhesive or elastic member functions as a damper for absorbing shock to be applied to the circuit board 32.

In operation, when current is supplied to the pump 1, the position detecting elements 40 detect the pole position of the rotor 16. At the same time, exciting current is supplied to the coils 20 wound on the pole portions of the stator 18 to rotate the rotor 16 and thereby rotate the impellers 12. As a result, the fuel is induced from the fuel inlet 4, and the fuel pressure is increased by the vanes 10 of the impellers 12. Then, the fuel is fed through the fuel passage 5, the space between the rotor 16 and the stator 18 and the space around the circuit package 28 to the fuel outlet 22. The fuel pressure is normally increased to about 2.5 kg/cm$^2$ as a pressure differential between the same and a suction pressure in a suction pipe (not shown). When the operation of the pump 1 is stopped, the fuel pressure is reduced. Accordingly, the cap 28L having a relatively thin wall is exposed to such a pressure fluctuation, and is inclined to be deflected. However, since the top wall of the cap 28L is formed with the indent portion 28c spaced by the gap 43 from the circuit board 32, the circuit board 32 is prevented from being damaged. Furthermore, since the circuit board 32 is bonded to the inner surface 44 of the cap 28L by the adhesive having elasticity such as silicone rubber, the pressure fluctuation applied to the wall of the cap 28L is absorbed by the adhesive to thereby prevent the slippage or damage of the circuit board 32. In addition, as the circuit package 28 is located in the fuel passage, it is normally cooled by the fuel, thereby suppressing heat generation in the circuit package 28 and protecting the circuit boards 32 and 38 and the control devices as well as the sensor devices.

Figure 5:
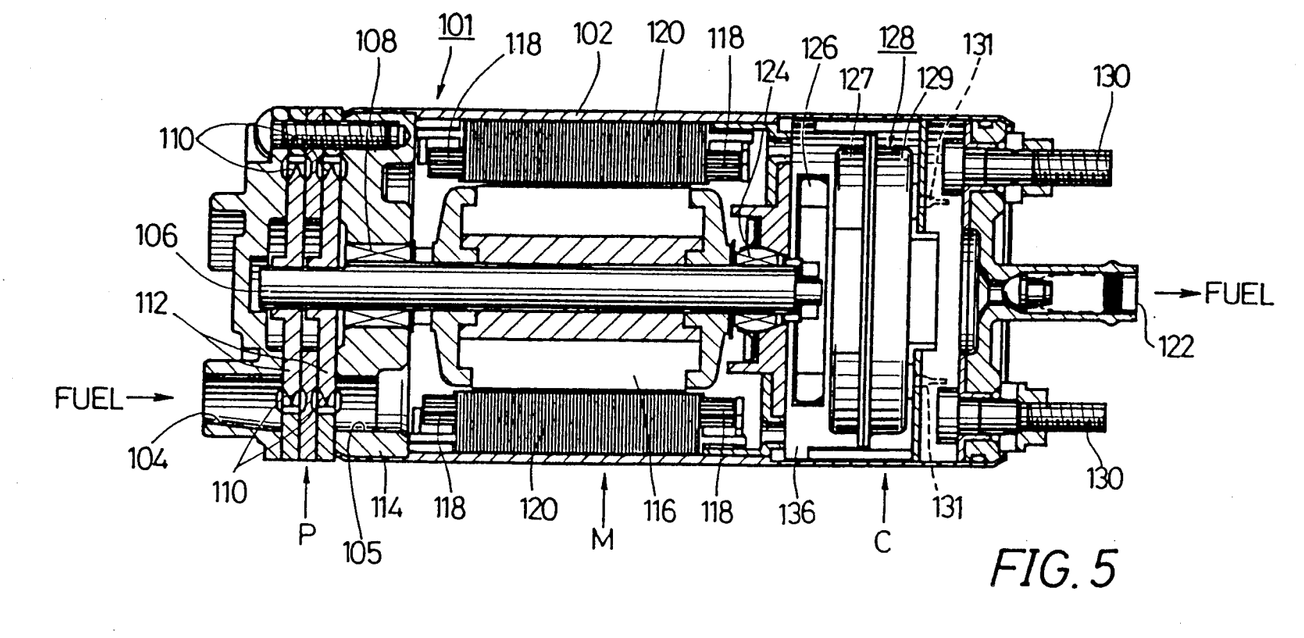
FIG. 5 is a vertical sectional view of a second preferred embodiment of the motor-driven pump according to the present invention.

Referring next to FIG. 5 which shows another preferred embodiment of the present invention, the construction of a motor-driven fuel pump 101 is substantially the same as that of the first preferred embodiment except that a circuit package 128 is composed of a cap-like first case 127 and a cap-like second case 129 fixedly connected with each other, and that a holder 136 for holding the circuit package 128 is fixedly mounted to a pump housing 102. The other parts are substantially the same as the first preferred embodiment, and are designated by the reference numerals in FIG. 1 plus 100, and explanation thereof will be omitted hereinafter.

Figure 6:
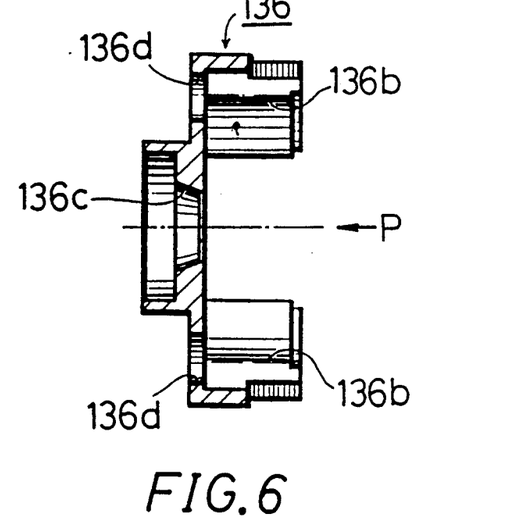
FIG. 6 is a vertical sectional view of the circuit package holder shown in FIG. 5.
Figure 7:
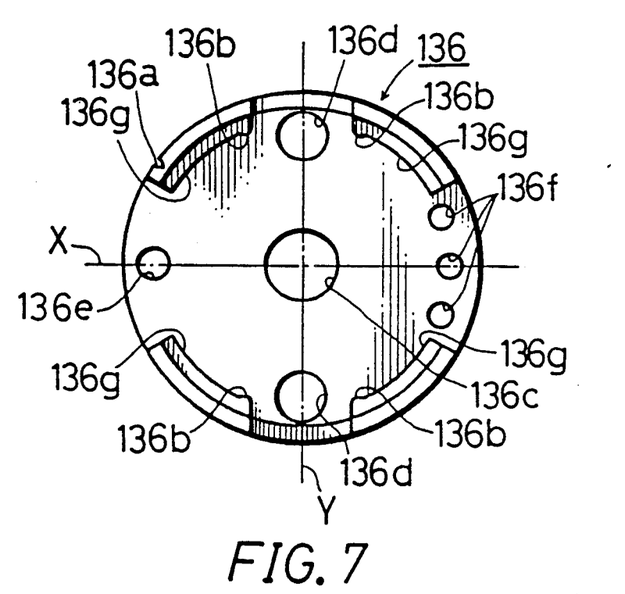
FIG. 7 is a view taken in the direction of arrow P in FIG. 6.

Referring to FIGS. 6 and 7, the circuit package holder 136 is formed at its outer circumference with a recess 136a to be engaged with an inward projection (not shown) of the pump housing 102. The holder 136 is also formed with four axial projections 136g for holding the circuit package 128. Each of the axial projections 136g is formed with a radial projection 136b for strengthening the holding condition of the circuit package 128. The holder 136 is further formed with a central hole 136c for inserting the rotating shaft 136, and with a pair of fuel passage holes 136d arranged at diametrically opposite positions lying on a vertical center line Y, and with holes 136e and 136f for inserting wires of the coils 120. The hole 136e and the center one of the holes 136f are arranged at diametrically opposite positions lying on a horizontal center line X.

Figure 8:
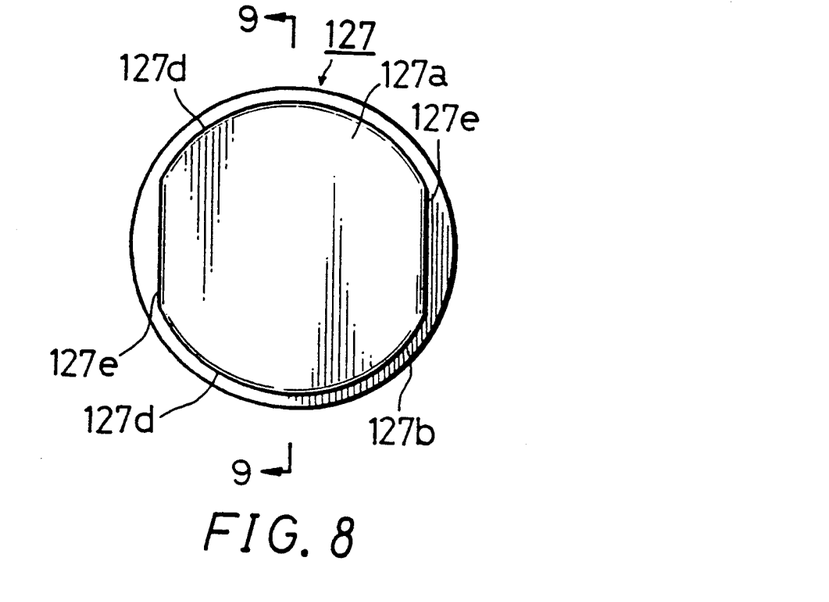
FIG. 8 is a plan view of the circuit package as viewed from the left side in FIG. 5.
Figure 9:
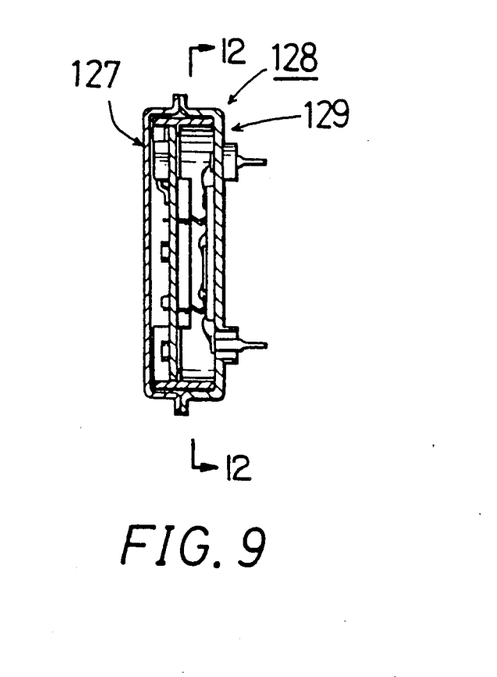
FIG. 9 is a cross section taken along the line A—A in FIG. 8.

Referring to FIGS. 8 and 9, the first case 127 of the circuit package 128 is configured in a substantially oval shape in plan composed of a flat top portion 127a, a pair of opposite arcuate portions 127d and a pair of opposite parallel straight portions 127e. The arcuate portions 127d of the first case 127 are held by the four axial projections 136g of the holder 136.

Figure 10:
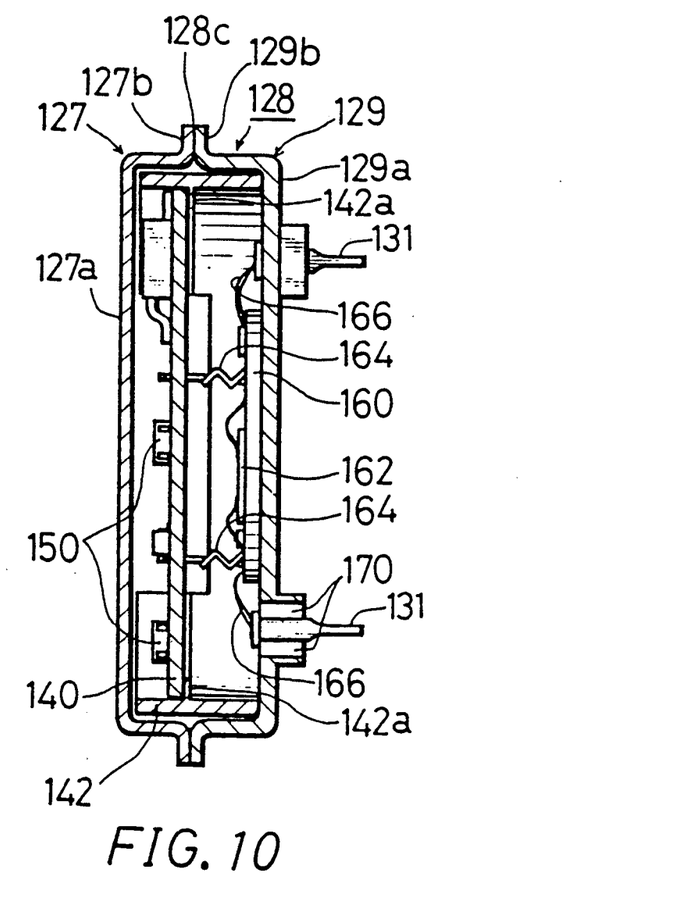
FIG. 10 is an enlarged view of FIG. 9.

Referring to FIG. 10 which shows a detailed structure of the circuit package 128, the circuit package 128 is composed of the first case 127 and the second case 129 fixedly connected with each other. The first case 127 is formed at its outer circumference with a flange 127b, and the second case 129 is also formed at its outer circumference with a flange 129b to be welded to the flange 127b of the first case 127 to form a welded surface 128c. The second case 129 is provided with hermetic seal portions 170 for sealingly inserting connection terminals 131. A first circuit board 140 mounting thereon position detecting elements 150 (e.g., Hall devices) is held by a circuit board holder 142. The holder 142 is circumferentially fixed to the inner circumferential wall surfaces of the first and second cases 127 and 129, and is further bonded to the second case 129. The holder 142 is formed with a pair of arcuate inward projections 142a for mounting thereon the first circuit board 140 and fixing same by adhesive. A second circuit board 160 mounting thereon a transistor 162 for example, for switching on and off the excitation of the coils 20 is fixed by soldering or adhesive on the inner surface of a top wall 129a of the second case 129. The first and second circuit boards 140 and 160 are electrically connected with each other through lead wires 164, and the second circuit board 160 is electrically connected to the connection terminals 131 through lead wires 166.

Figure 11:
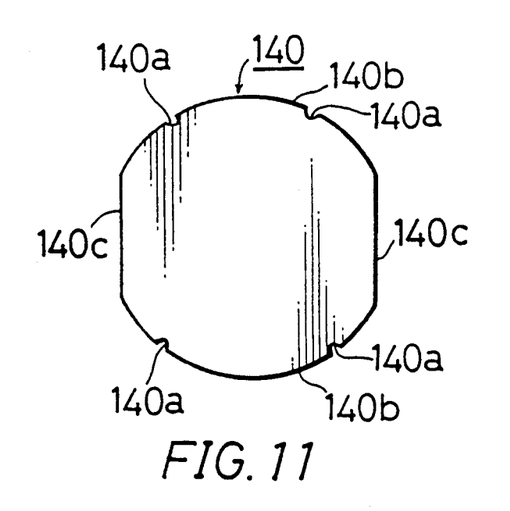
FIG. 11 is a plan view of the circuit board shown in FIG. 10.
Figure 12:
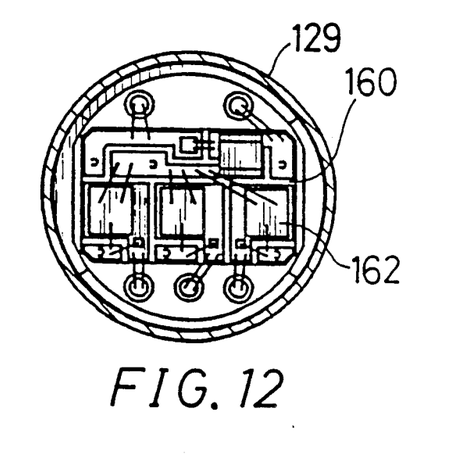
FIG. 12 is a cross section taken along the line B—B in FIG. 9.
Figure 13:
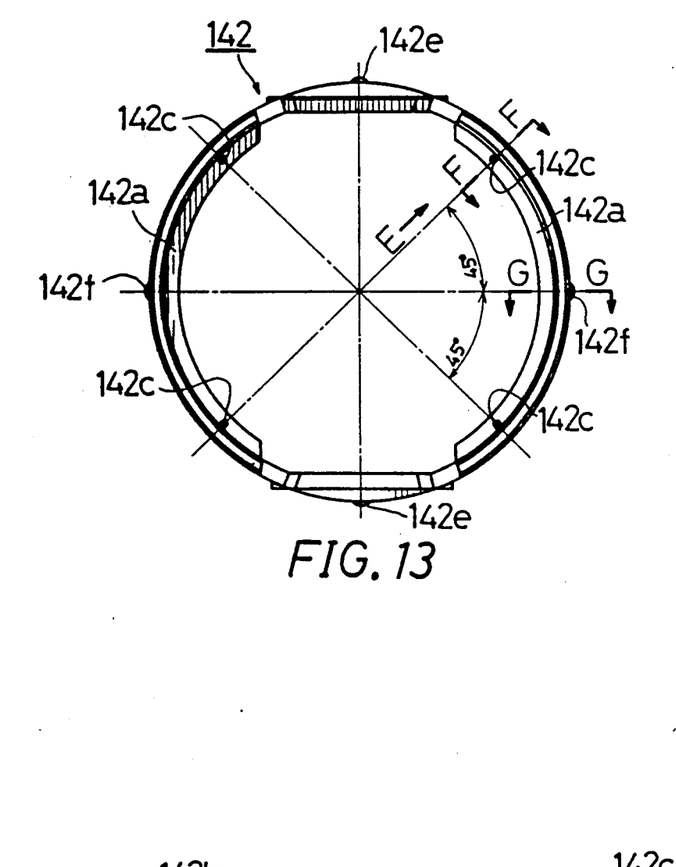
FIG. 13 is a plan view of the circuit board holder shown in FIG. 10.
Figure 14:
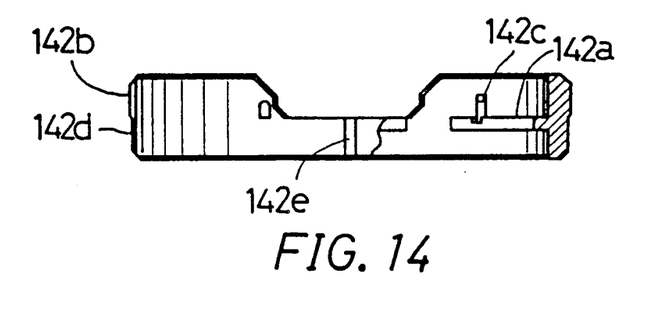
FIG. 14 is a partially sectional elevational view of FIG. 13.
Figure 15:
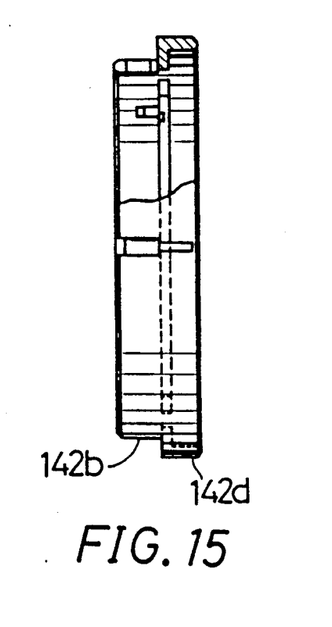
FIG. 15 is a partially sectional side view of FIG. 13.
Figure 16:
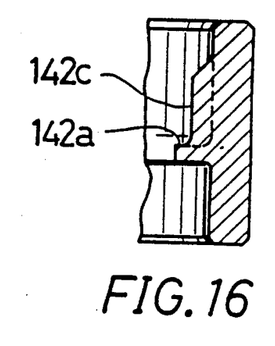
FIG. 16 is a cross section taken along the line F—F in FIG. 13.
Figure 17:
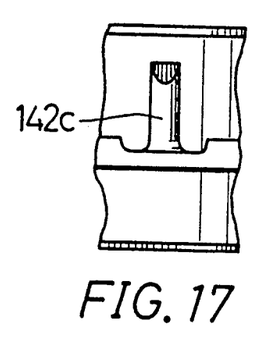
FIG. 17 is a view taken in the direction of arrow E in FIG. 13.
Figure 18:
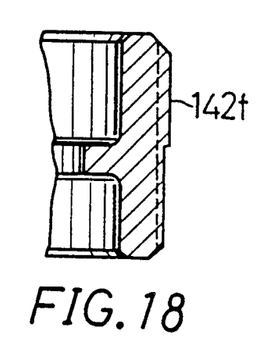
FIG. 18 is a cross section taken along the line G—G in FIG. 13.

As shown in FIG. 11, the first circuit board 140 is configured in an oval shape in plan similarly to the configuration of the first case 127. That is, the first circuit board 140 is formed at its outer periphery with a pair of opposite arcuate portions 140b and a pair of parallel opposite straight portions 140c. Each of the arcuate portions 140b is formed with a pair of recesses 140a to be engaged with the arcuate projections 142a of the holder 142 as will be hereinafter described.

Referring to FIGS. 13 to 18, the circuit board holder 142 is composed of an oval portion 142b to be fixed to the first case 127 and a cylindrical portion 142d to be fixed to the second case 129. The oval portion 142b is formed at its outer circumference with a pair of projections 142f at diametrically opposite positions, and the cylindrical portion 142d is formed at its outer circumference with a pair of projections 142e at diametrically opposite positions. These projections 142f and 142e are engaged with recesses (not shown) formed on the inner circumferential surfaces of the first and second cases 127 and 129. The pair of arcuate inward projections 142a are formed substantially at the border of the oval portion 142b and the cylindrical portion 142d. Each of the arcuate projections 142a is formed with a pair of projections 142c projecting into the oval portion 142b which projections 142c are engaged with the recesses 140a of the first circuit board 140.

Figure 19:
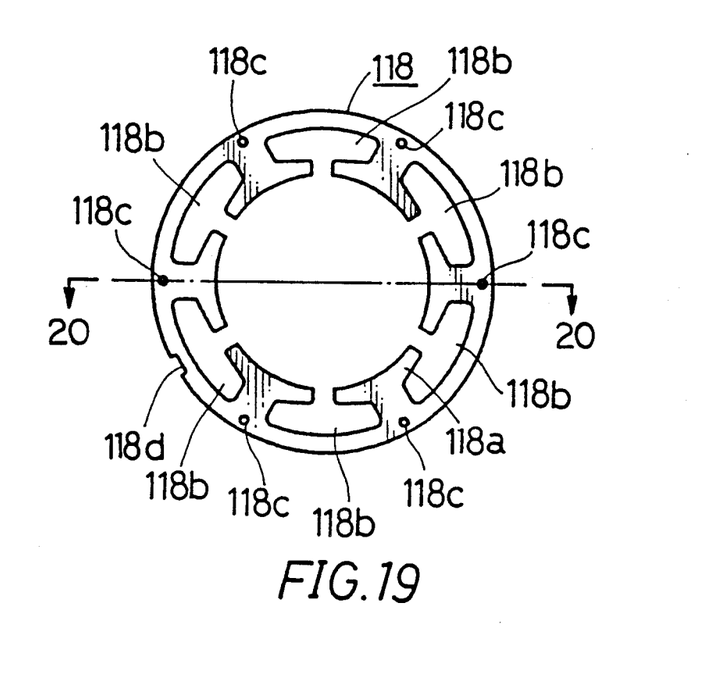
FIG. 19 is a plan view of the stator shown in FIG. 5.
Figure 20:
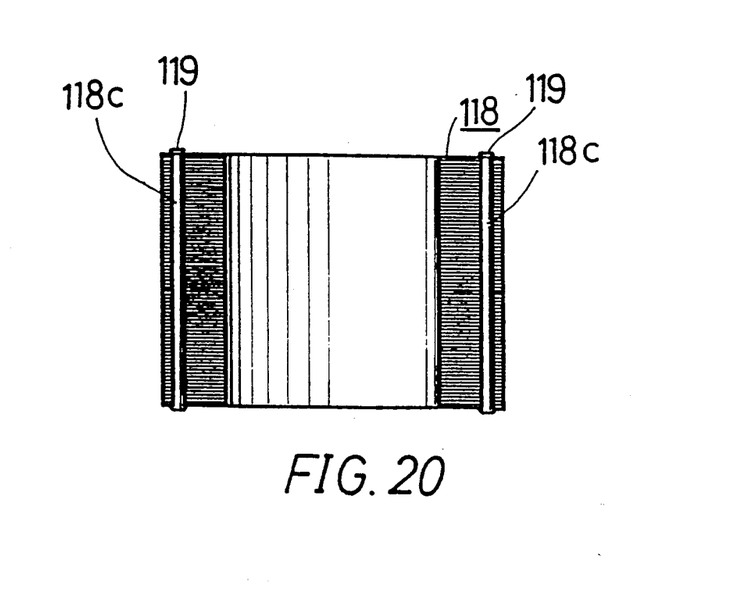
FIG. 20 is a cross section taken along the line C—C in FIG. 19.

Referring to FIGS. 19 and 20, a stator 118 is constructed by stacking a plurality of thin plates formed of ferromagnetic material. The stator 118 is formed with plural pole portions 118a for winding the coils 120 therearound and plural cutout portions 118b for receiving the coils 120 wound. The stator 118 is further formed at its outer circumference with a recess 118d to be engaged with an inward projection (not shown) of the pump housing 102. The stator 118 is further formed with plural holes 118c into which plural pins 119 are inserted so as to coincide the plural thin plates constituting the stator 118. All the plural holes 118c is not necessary to be filled with the pins 119.

As mentioned above, the stator 118 is positioned with respect to the pump housing 102 by engaging the recess 118d with the inward projection of the pump housing 102. Accordingly, the rotor 116 and the sensor magnet 126 may be precisely positioned relative to the stator 118.

On the other hand, the circuit package holder 136 is positioned with respect to the pump housing 102 by engaging the recess 136a of the holder 136 with the inward projection of the pump housing 102. Further, the circuit package 128 is positioned with respect to the holder 136 by engaging the projections 136g of the holder 136 with the outer surface of the first case 127 of the circuit package 128. Further, the circuit board holder 142 is positioned with respect to the circuit package 128 by engaging the projections 142e and 142f of the holder 142 with the inner circumferential recesses of the circuit package 128. Further, the circuit board 140 is positioned with respect to the circuit board holder 142 by engaging the recesses 140a of the circuit board 140 with the projections 142c of the holder 142. Accordingly, the position detecting elements 150 fixed on the circuit board 140 are positioned with respect to the pump housing 102. Consequently, the position detecting elements 150 are positioned with respect to the stator 118. Therefore, the pole positions of the rotor 116 can be precisely detected by the position detecting elements 150, and a switching timing of the transistor can be made uniform for every pump 101 to be manufactured.

Referring next to FIGS. 21 to 24 which show a third preferred embodiment having substantially the same construction as the first preferred embodiment except that a base plate 229 is formed with positioning means 229b and 229c, the circuit package 228 is formed of metal (e.g., stainless steel) having a high heat conductivity or glass, and is constructed of a substantially cylindrical cap 227 and a circular base plate 229. The cap 227 is formed with an annular flange 227a entirely welded to the base plate 229. The connection terminals 231 are inserted through hermetic seal portions such as metal or glass formed in the base plate 229. The annular circuit board 240 is fixedly mounted on the inner wall surface of the cap 227 opposed to the sensor magnet, and the circuit board 260 is bonded to the inner surface of the base plate 229 by adhesive such as silicone rubber.

Figure 21:
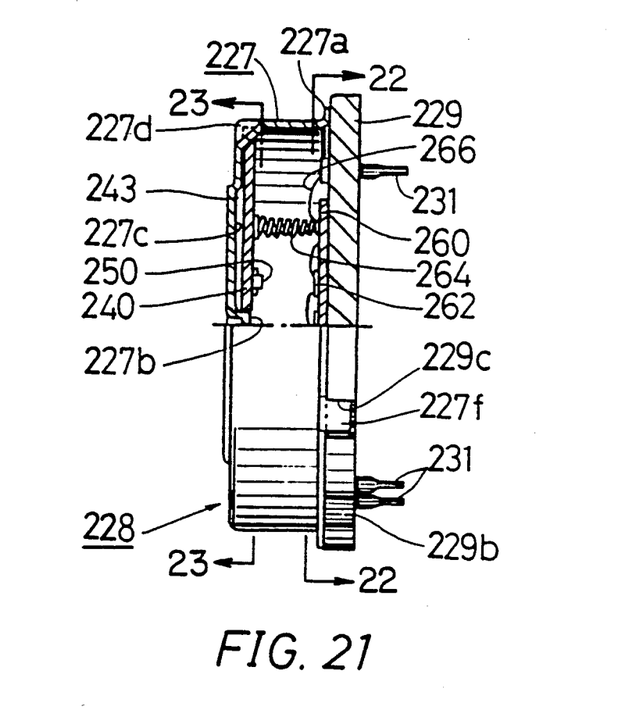
FIG. 21 is a partially sectional side view of the circuit package of a third preferred embodiment according to the present invention.

The position detecting elements (e.g., Hall device) for detecting the angular position of the poles of the rotor are mounted on the inner surface of the circuit board 240, and are arranged on a circle corresponding to the locus of rotation of the magnet elements of the sensor magnet. The wall thickness of the cap 227 is relatively small, and the top wall of the cap 227 mounting the circuit board 240 is partially projected outwardly to form an annular indent portion 227c and define an annular space 243 between the indent portion 227c and the outer surface of the circuit board 240 at a portion where the position detecting elements 250 are mounted. In the case that the sensor magnet is not used, the position detecting elements 250 are so arranged as to be opposed to the poles of the rotor.

The circuit board 240 is fixed at its outer circumferential portion to the annular inner surface 244 of the top wall of the cap 227 by using adhesive having elasticity even after curing such as silicone rubber.

The control devices mounted on the circuit boards 227 and 229 are connected to each other through lead wires 264, and are also connected to the connection terminals 231 through lead wires 266. However, the circuit board 260 may be omitted provided that all the control devices are mounted on the circuit board 240 only.

Figure 23:
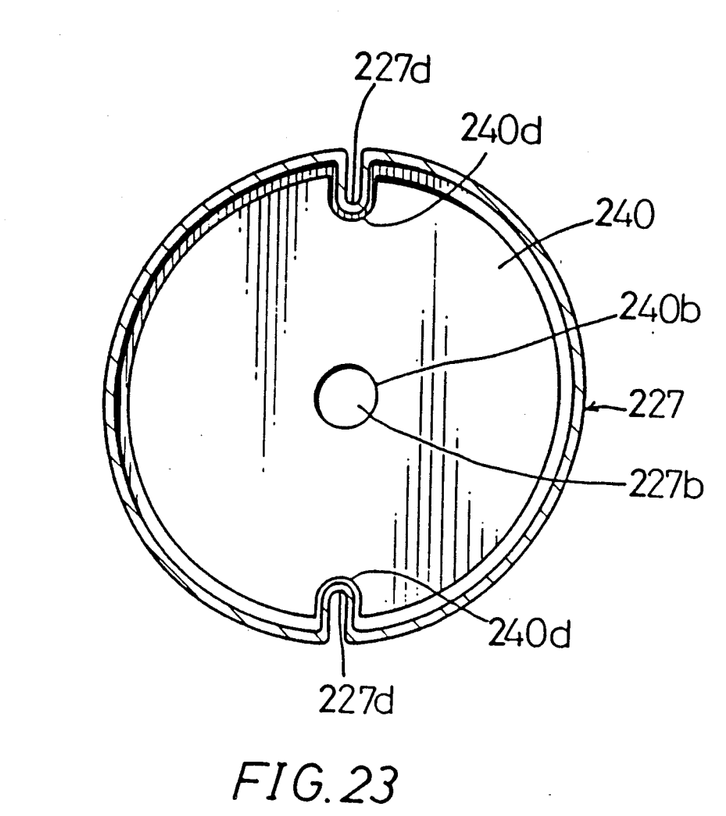
FIG. 23 is a view taken in the direction of arrows H in FIG. 21.
Figure 24:
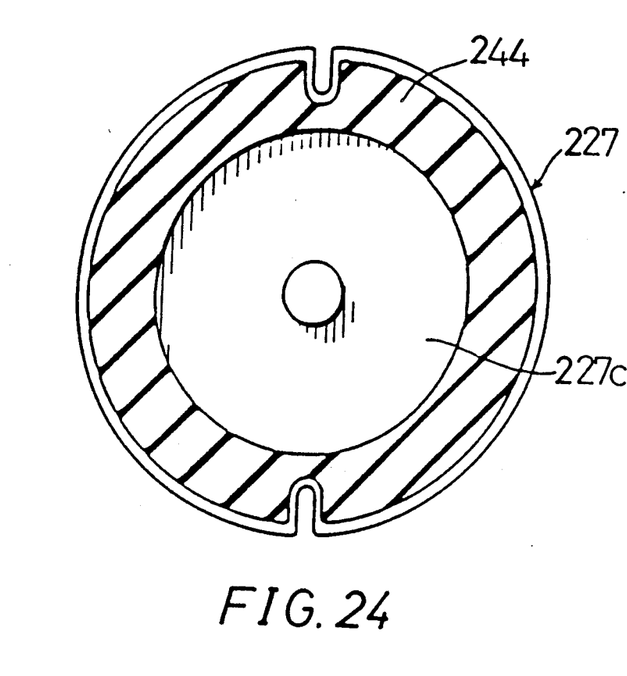
FIG. 24 is a view similar to FIG. 23 with the circuit board removed.

Referring to FIGS. 23 and 24, the cap 227 is formed at its outer circumference with a pair of inward projections 227d at diametrically opposite positions, while the circuit board 240 is formed with a pair of recesses 240d to be engaged with the inward projections 227d of the cap 227. Further, the cap 227 is formed with a central inward projection 227b, and the circuit board 240 is formed with a central hole 240b to be engaged with the central inward projection 227b of the cap 227. Thus, the circuit board 240 is firmly positioned with respect to the cap 227. The base plate 229 is circumferentially positioned to the pump casing. Accordingly, the position detecting elements 250 fixed on the circuit board 240 can be positioned with respect to the stator. Of course, the shape and the number of the positioning means, that is, the projections 227d and 227b, the recesses 240d and the hole 240b may be suitably modified.

As shown in FIGS. 21 and 24, the annular inner surface 244 of the top wall of the cap 227 is coated with adhesive having elasticity even after curing such as silicone rubber, so as to bond the outer circumferential portion of the circuit board 240 to the annular inner surface 244 of the cap 227. The adhesive may be replaced by any other elastic member capable of elastically fixing the circuit board 240 to the inner surface 244 of the cap 227. Such adhesive or elastic member functions as a damper for absorbing shock to be applied to the circuit board 240.

Figure 22:
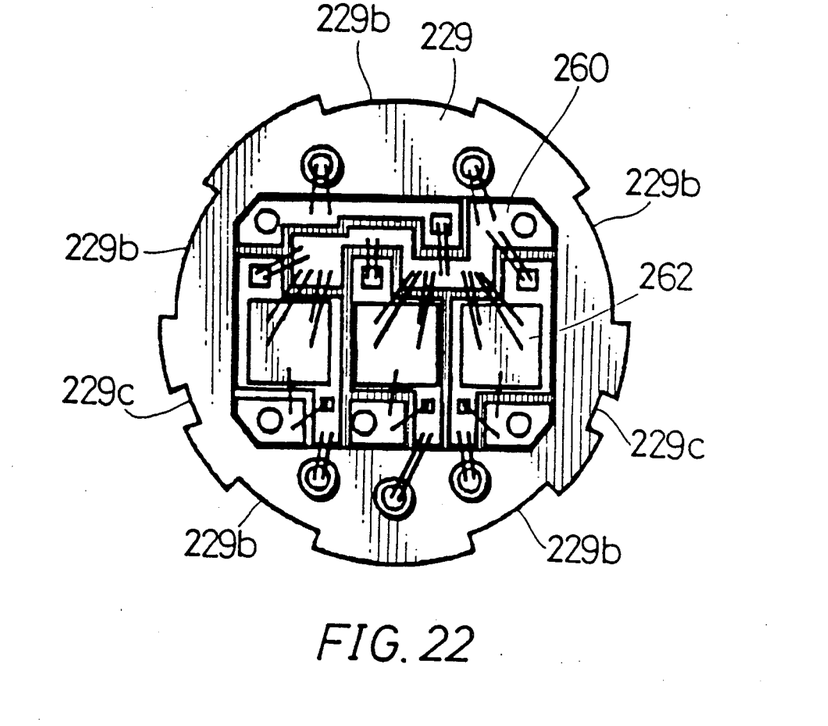
FIG. 22 is a view taken in the direction of arrows K in FIG. 21.

As shown in FIG. 22, the base plate 229 is formed at its outer circumference with the recesses 229b and 229c. The recesses 229b are adapted to be engaged with projections of a circuit package holder (not shown) to be positioned to the pump housing, and the recesses 229c are adapted to be engaged with projections 229c (see FIG. 21) of the cap 227. Thus, the cap 227 is precisely positioned with respect to the base plate 229, and the base plate 229 is precisely positioned with respect to the circuit package holder.

As mentioned above, the circuit board 240 is also positioned with respect to the cap 227 by the engagement of the projections 227d of the cap 227 with the recesses 240d of the circuit board 240. Accordingly, the position detecting elements 250 fixed on the circuit board 240 are positioned with respect to the pump housing, that is, with respect to the stator. In this preferred embodiment, as the circuit board holder 142 used in the second preferred embodiment is not provided, the positioning accuracy of the position detecting elements 250 is more improved.

Having thus described the preferred embodiment of the invention, it should be understood that numerous structural modifications and adaptations may be made without departing from the spirit of the invention.

What is claimed is:

1. A motor-driven pump comprising:
a pump housing;
a brushless motor mounted in said pump housing;
pump means mounted in said pump housing and adapted to be driven by said brushless motor; and
a circuit package mounted in a liquid passage defined in said pump housing, said circuit package enclosing a circuit board mounting thereon a control circuit for controlling rotation of said brushless motor and means for detecting a rotor position of said brushless motor, wherein said circuit board is fixed through an elastic member to an inner wall of said circuit package with a gap defined between said circuit board and said inner wall, and said circuit package is opposed to said brushless motor at a position where said circuit board is spaced a distance from said brushless motor in an axial direction of a rotating shaft of said brushless motor.

2. The motor-driven pump as defined in claim 1, wherein said brushless motor comprises a multipole rotor formed of permanent magnet and fixed to said rotating shaft, a stator formed of ferromagnetic material and fixed to said pump housing, said stator having plural pole portions corresponding to poles of said rotor, and plural coils wound on said pole portions of said stator.

3. The motor-driven pump as defined in claim 1 further comprising a sensor magnet fixed to said rotating shaft and located between said brushless motor and said circuit package.

4. The motor-driven pump as defined in claim 1, wherein said circuit package comprises a base plate fixed to said pump housing and a thin-walled cap fixed to said base plate.

5. The motor-driven pump as defined in claim 4, wherein said circuit board is fixed to an inner surface of said thin-walled cap.

6. The motor-driven pump as defined in claim 5 further comprising another circuit board fixed to an inner surface of said base plate.

7. The motor-driven pump as defined in claim 1, wherein said elastic member comprises an adhesive material having elasticity even after curing.

8. The motor-driven pump as defined in claim 7, wherein said adhesive material comprises silicone rubber.

9. The motor-driven pump as defined in claim 1, wherein said means for detecting the rotor position comprises plural Hall devices arranged on a circle corresponding to a locus of rotation of said poles of said rotor.

10. The motor-driven pump as defined in claim 5, wherein said thin-walled cap is formed with an outward projecting wall portion to define said gap.

11. The motor-driven pump as defined in claim 5, wherein said thin-walled cap is formed at its outer circumference with an inward projection, and said circuit board is formed at its outer circumference with a recess to be engaged with said inward projection of said thin-walled cap.

12. The motor-driven pump as defined in claim 11, wherein said thin-walled cap is formed with a central inward projection, and said circuit board is formed with a central hole to be engaged with said central inward projection.

13. A circuit package for use with a motor-driven pump including a pump housing, a brushless motor mounted in said pump housing, pump means mounted in said pump housing and adapted to be driven by said brushless motor; wherein said circuit package is mounted in a liquid passage defined in said pump housing, said circuit package enclosing a circuit board mounting thereon a control circuit for controlling rotation of said brushless motor and means for detecting a rotor position of said brushless motor, wherein said circuit board is fixed through an elastic member to an inner wall of said circuit package with a gap defined between said circuit board and said inner wall, and said circuit package is opposed to said brushless motor at a position where said circuit board is spaced a distance from said brushless motor in an axial direction of a rotating shaft of said brushless motor.

14. The circuit package as defined in claim 13, wherein said circuit package comprises a base plate fixed to said pump housing and a thin-walled cap fixed to said base plate.

15. The circuit package as defined in claim 14, wherein said circuit board is fixed to an inner surface of said thin-walled cap.

16. The circuit package as defined in claim 15 further comprising another circuit board fixed to an inner surface of said base plate.

17. The circuit package as defined in claim 13, wherein said elastic member comprises an adhesive material having elasticity even after curing.

18. The circuit package as defined in claim 17, wherein said adhesive material comprises silicone rubber.

19. The circuit package as defined in claim 13, wherein said means for detecting the rotor position comprises plural Hall devices arranged on a circle corresponding to a locus of rotation of said poles of said rotor.

20. The circuit package as defined in claim 15, wherein said thin-walled cap is formed with an outward projecting wall portion to define said gap.

21. The circuit package as defined in claim 15, wherein said thin-walled cap is formed at its outer circumference with an inward projection, and said circuit board is formed at its outer circumference with a recess to be engaged with said inward projection of said thin-walled cap.

22. The circuit package as defined in claim 21, wherein said thin-walled cap is formed with a central inward projection, and said circuit board is formed with a central hole to be engaged with said central inward projection.

23. The motor-driven pump as defined in claim 1, wherein said circuit package comprises a substantially cylindrical first cap-like case and a substantially cylindrical second cap-like case fixedly connected with each other, and said second cap-like case is provided with hermetic seal portions for sealingly inserting connection terminals.

24. The motor-driven pump as defined in claim 23 further comprising a substantially cylindrical first holder for holding said circuit package, said first holder being fixed in position to an inner wall of said pump housing.

25. The motor-driven pump as defined in claim 23, wherein said first case is formed with a first flange, and said second case is formed with a second flange, said first flange being welded to said second flange.

26. The motor-driven pump as defined in claim 24 further comprising a substantially cylindrical second holder for holding said circuit board, said second holder being fixed in position to inner walls of said first case and said second case, said second holder being formed with a pair of opposed arcuate inward projections for fixedly mounting thereon said circuit board through said elastic member.

27. The motor-driven pump as defined in claim 26, wherein said elastic member comprises an adhesive material having elasticity even after curing.

28. The motor-driven pump as defined in claim 26 further comprising another circuit board fixed on the inner wall of said second case.

29. The motor-driven pump as defined in claim 24, wherein said first holder is formed with a central hole for inserting said rotating shaft, a pair of fuel passage holes arranged at diametrically opposite positions, and a plurality of holes for inserting wires of coils.

* * * * *